US 8,494,800 B2

(12) United States Patent
Matsushita

(10) Patent No.: US 8,494,800 B2
(45) Date of Patent: Jul. 23, 2013

(54) METHOD AND PROGRAM FOR IDENTIFYING MECHANICAL ERRORS

(75) Inventor: Tetsuya Matsushita, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 234 days.

(21) Appl. No.: 12/851,582

(22) Filed: Aug. 6, 2010

(65) Prior Publication Data

US 2011/0040523 A1 Feb. 17, 2011

(30) Foreign Application Priority Data

Aug. 11, 2009 (JP) .................................. 2009-186735

(51) Int. Cl.
*G06F 15/00* (2006.01)

(52) U.S. Cl.
USPC .......................................................... 702/95

(58) Field of Classification Search
USPC .......................................................... 702/95
See application file for complete search history.

(56) References Cited

U.S. PATENT DOCUMENTS

| 5,111,590 A * | 5/1992 | Park .................................. 33/502 |
| 5,841,668 A * | 11/1998 | Pahk et al. ...................... 700/160 |
| 7,206,716 B2 * | 4/2007 | Davidson et al. ............. 702/151 |
| 2001/0008994 A1 * | 7/2001 | Omori et al. .................... 702/95 |
| 2003/0033105 A1 | 2/2003 | Yutkowitz |
| 2004/0193385 A1 * | 9/2004 | Yutkowitz ...................... 702/151 |
| 2005/0234671 A1 * | 10/2005 | Morfino .......................... 702/95 |
| 2010/0241394 A1 * | 9/2010 | Ihara et al. ..................... 702/151 |

FOREIGN PATENT DOCUMENTS

| JP | 2004-219132 A1 | 8/2004 |
| JP | 2004-525467 A1 | 8/2004 |
| JP | 2005-061834 A1 | 3/2005 |

OTHER PUBLICATIONS

Ichiro Inasaki et al., "*Form Shaping Theory for Machine Tools*," Yokendo Co., Ltd., Japan, Jul. 28, 1997 (first edition), pp. 86-90 and 122-125.
Japanese Office Action dated Apr. 30, 2013.

* cited by examiner

*Primary Examiner* — Bryan Bui
(74) *Attorney, Agent, or Firm* — Burr & Brown

(57) ABSTRACT

A method for identifying geometric errors with respect to at least two translational axes and at least one rotational axis of a machine using a control device is disclosed. The method comprises the steps of: measuring positions of a jig in three-dimensional space using a position measurement sensor, wherein a measurement is carried out when the jig being indexed around the rotational axis by a plurality of angles is located at the positions; approximating a plurality of measured values of the positions measured in the measuring step to a circular arc; and calculating an error in regard to a center position of the rotational axis and/or a tilt error in the rotational axis, and tilt errors in the translational axes, based on the circular arc resulting from the approximating step.

10 Claims, 5 Drawing Sheets

METHOD AND PROGRAM FOR IDENTIFYING MECHANICAL ERRORS

This application claims the entire benefit of Japanese Patent Application Number 2009-186735 filed on Aug. 11, 2009, the entirety of which is incorporated by reference.

BACKGROUND OF THE INVENTION

1. Field of the Invention

The present invention relates to a method and a program for identifying geometric errors of a machine having translational and rotational drive axes.

2. Description of Related Art

As an example of a machine having translational and rotational drive axes, there is known a machine tool for processing parts or metal molds. Such a machine tool can process a workpiece into a desired shape by a material removal process including relative movements of both or either of a tool and a workpiece while rotating the tool or the workpiece.

As an example of this machine tool, FIG. 1 shows a schematic view of a three-axis control machining center (three-axis machine) having three translational axes. A spindle head 2 is allowed to make a translational movement with 2 degrees of freedom with respect to a bed 1 along an X-axis and a Z-axis, which are translational axes orthogonal with each other. A table 3 is allowed to make a translational movement with 1 degree of freedom with respect to the bed 1 along a Y-axis which is a translational axis orthogonal to the X-axis and the Z-axis. Accordingly, the spindle head 2 has 3 degrees of freedom of translational movement with respect to the table 3. The machine tool is driven using a servo motor (not shown) controlled by a numerical controlling device. A workpiece is secured to the table 3 and a tool is attached to the spindle head 2 and being driven to rotate. A relative position between the workpiece and the tool is controlled and a processing is performed.

As another example of this machine tool, FIG. 2 shows a schematic view of a five-axis control machining center (five-axis machine) having three translational axes and two rotational axes. A spindle head 2 is allowed to make a translational movement with 2 degrees of freedom with respect to a bed 1 along an X-axis and a Z-axis, which are translational axes orthogonal with each other. A table 3 is allowed to make a rotational movement with 1 degree of freedom with respect to a cradle 4 along a C-axis which is a rotational axis, and the cradle 4 is allowed to make a rotational movement with 1 degree of freedom with respect to a trunnion 5 along an A-axis which is a rotational axis. The A-axis and the C-axis are orthogonal with each other. Further, the trunnion 5 is allowed to make a translational movement with 1 degree of freedom with respect to the bed 1 along a Y-axis which is a translational axis orthogonal to the X-axis and the Z-axis. Accordingly, the spindle head 2 has 3 degrees of freedom of translational movement as well as 2 degrees of freedom of rotational movement, with respect to the table 3. Therefore, not only a relative position between the workpiece and the tool but a relative posture therebetween can also be controlled during processing.

As factors influencing geometric accuracy of movements of the five-axis machine, geometric errors between the axes (hereinafter simply referred to as geometric errors) are known, which include, for example, a center position error of the rotational axis (i.e., displacement from a supposed position) and a tilt error of the rotational axis (i.e., deviation in parallelism between the rotational axis and the translational axis). Although geometric errors such as deviation in perpendicularity of two translational axes relative to one another are present in the three-axis machine, the number of geometric errors is larger in the five-axis machine than in the three-axis machine because the number of axes is larger in the five-axis machine. To be more specific, a total of five geometric errors are possibly present in the three-axis machine, that is, three errors of perpendicularity between each of the translational axes and two errors of perpendicularity between the rotational axis of the spindle head and the translational axes. Meanwhile, in the case of the five-axis machine, for one rotational axis, the center position error of the rotational axis is possibly present in two directions and the tilt error of the rotational axis is also possibly present in two directions, so that four possible geometric errors are present per one rotational axis. Since the five-axis machine contains two rotational axes, eight geometric errors are possibly present. Further, as with the three-axis machine, five geometric errors are also possibly present in the five-axis machine in regard to the translational axes, i.e., errors of three perpendicularity between each of the translational axes, and two errors of perpendicularity between the rotational axis of the spindle head and the translational axes. Therefore, the total of thirteen geometric errors are possibly present in the five-axis machine.

Further, since the three-axis machine does not have any reference position such as the center of a rotational axis, a relative processing is carried out in the three-axis machine on the basis of an arbitrary processing point. On the contrary, an error occurs in the five-axis machine when a relation between a rotational axis and the workpiece or a relation between a rotational axis and the tool differs from a supposed relation. In other words, an influence of the geometric errors in the processing accuracy is more pronounced in the five-axis machine than in the three-axis machine. It can be said that, if the geometric errors are identified, highly accurate processing will be performed by means of various methods; for example, reducing the geometric errors by adjustment, controlling with a command program taking into consideration the geometric errors, and controlling for compensating the geometric errors. For this reason, it is extremely important for highly accurate processing in the five-axis machine to know the geometric errors.

As a first method for identifying geometric errors in the five-axis machine, Japanese Laid-open Patent Publication No. 2004-219132 proposes a method, in which a double ball bar measuring device is employed, which is capable of measuring a distance between centers of two balls, i.e., a spindle-side ball and a table-side ball, and one rotational axis is moved in synchronization with two translational axes which are moved along an arc in such a manner that the distance between centers of the spindle-side ball and the table-side ball is kept constant, and a relative displacement between the spindle-side ball and the table-side ball is measured. The obtained measurement data concern an arc trajectory, and some of geometric errors can be identified from the center deviation thereof. By changing the attachment direction of the ball bar, different geometric errors can be identified, so that the total of eight geometric errors in regard to the rotational axis can be identified.

As a second method for identifying geometric errors in the five-axis machine, Japanese Laid-open patent Publication No. 2005-61834 proposes a method, in which a ball is secured on the table and while indexing positions of the ball around a rotational axis, the center position of the ball is measured at plural different points using a touch trigger probe attached to the spindle head. A plane is calculated from the plurality of measured center positions of the ball, a vector normal to this plane is considered as an actual vector of the rotational axis, and a tilt error of the rotational axis is obtained from a difference between an ideal vector and the actual vector of the rotational axis. Further, the center position of the actual rotational axis is obtained from the plurality of measured values of the center positions of the ball in consideration of this actual vector, and a center position error of the rotational axis is obtained based on a difference between an ideal center position and the actual center position. Therefore, the total of eight geometric errors can be identified in regard to the rotational axis.

However, the first method employs a double ball bar, which is an expensive measuring device, and relatively skilled experience is required for manipulation of this double ball bar measuring device. Therefore, not everyone can easily implement this method.

In the second method, however, a touch trigger probe used in this method is relatively cheap and is usually provided in the machine tool as an option for the purpose of centering a workpiece, etc. Therefore, it is not necessary to additionally purchase a measuring device and the measuring device can be easily obtainable. Further, since the measurement operations are carried out by a control device, no particular skill is required and advantageously, measurements can be simply carried out. However, this method can only identify geometric errors in regard to the rotational axes, and disadvantageously geometric errors in regard to the translational axes cannot be identified. If geometric errors in regard to the translational axes are present, such errors influence the measured values of the center positions of the ball, which makes it impossible to accurately identify the geometric errors in regard to the rotational axes. Geometric errors in regard to the translational axes can be measured in advance using another method. However, since geometric errors vary in accordance with thermal displacement, secular change and the like, it may be difficult to accurately identify the geometric errors because of the influence of these changes. In order to know the geometric errors at a specific point of time, it is necessary to identify at the same time all the geometric errors.

In view of the above drawbacks of the conventional identification methods, the present invention seeks to provide a method and a program for identifying, substantially at the same time, geometric errors in regard to the translational axes in addition to geometric errors in regard to the rotational axes.

SUMMARY OF THE INVENTION

In accordance with one aspect of the present invention, as embodied and described herein, there is provided a method for identifying geometric errors with respect to at least two translational axes and at least one rotational axis of a machine using a control device, the method comprising the steps of: measuring positions of a jig in three-dimensional space using a position measurement sensor, wherein a measurement is carried out when the jig being indexed around the rotational axis by a plurality of angles is located at the positions; approximating a plurality of measured values of the positions measured in the measuring step to a circular arc; and calculating an error in regard to a center position of the rotational axis and/or a tilt error in the rotational axis, and tilt errors in the translational axes, based on the circular arc resulting from the approximating step.

In accordance with another aspect of the present invention, as embodied and described herein, there is provided a program stored in a medium for causing a computer to perform the method as described above.

With these configurations of the aforementioned identification method and program, not only geometric errors in regard to the rotational axes but also geometric errors in regard to the translational axes can be identified. Since these errors can be identified substantially at the same time, it is possible to know geometric errors at a specific point where a change occurs due to thermal displacement or the like, and a highly accurate processing can be performed using these obtained geometric errors. Further, if a touch trigger probe is used as a position measurement sensor, since the touch trigger probe is relatively cheap and easily obtainable, geometric errors can be easily identified.

According to a preferred embodiment of the aforementioned identification method, the approximating step may comprise determining a radius of the circular arc by measuring a distance from a center of the rotational axis to the plurality of measured values, and the error calculating step may comprise calculating the tilt errors in the translational axes from second-order components of the circular arc.

With this configuration, in addition to the above advantageous effects of the identification method according to the first aspect of the invention, while maintaining the accuracy, a more simple identification method can be realized.

According to an alternative preferred embodiment of the aforementioned identification method, the approximating step may comprise determining a radius of the circular arc by measuring a distance from a center of the rotational axis to the plurality of measured values, and the error calculating step may comprise calculating the geometric errors in regard to the rotational axis from first-order components of the circular arc.

With this configuration too, in addition to the above advantageous effects of the identification method according to the first aspect of the invention, while maintaining the accuracy, a more simple identification method can be realized.

According to another preferred embodiment of the aforementioned identification method, the machine may have more than two rotational axes, and in the measuring step, more than two angles may be indexed for measurement based on one rotational axis other than the rotational axis from which the plurality of angles are indexed.

With this configuration, in addition to the above advantageous effects of the identification method according to the first aspect of the invention, even if a more complicated machine is employed, geometric errors can be identified in a simple and accurate manner.

According to still another preferred embodiment of the aforementioned identification method, in the approximating step, axial components parallel to the rotational axis, from which the plurality of measured values are obtained, may be approximated to a circular arc, and a tilt error in the rotational axis may be calculated in the error calculating step from first-order components of the circular arc.

With this configuration, in addition to the above advantageous effects of the identification method according to the first aspect of the invention, while maintaining the accuracy, a more simple identification method can be realized.

BRIEF DESCRIPTION OF THE DRAWINGS

The above aspect, other advantages and further features of the present invention will become more apparent by describing in detail illustrative, non-limiting embodiments thereof with reference to the accompanying drawings, in which.

DETAILED DESCRIPTION OF THE EXEMPLARY EMBODIMENTS

Figure 1:
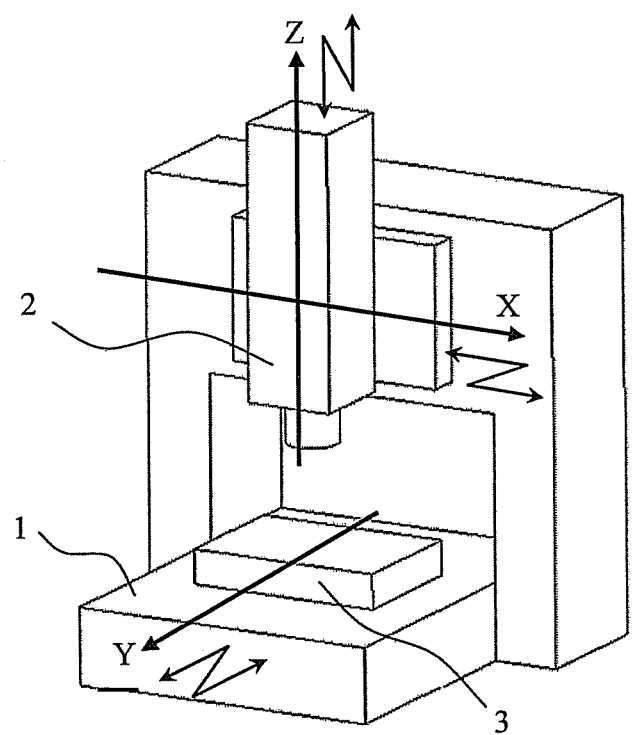
FIG. 1 is a schematic view of a three-axis control machining center.
Figure 2:
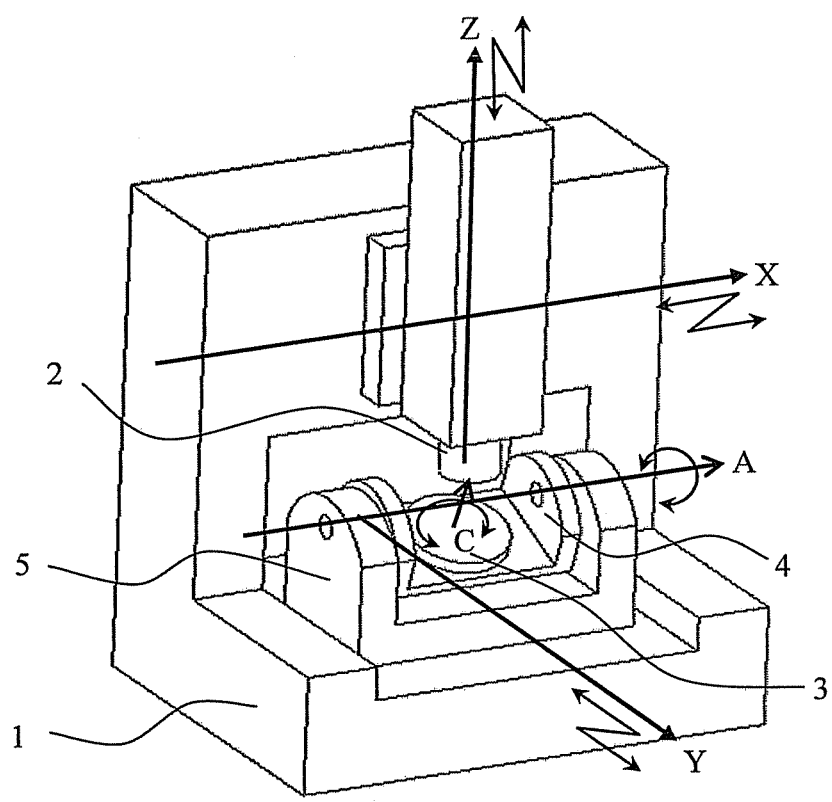
FIG. 2 is a schematic view of a five-axis control machining center.

With reference to the accompanying drawings where necessary, a method for identifying errors of a five-axis control machining center shown in FIG. 2, which is one exemplary embodiment of the present invention, using a computer (i.e., controller (not shown)) will be described below. The computer may be a numerical controlling device for the five-axis machine, a separate computer connected to the numerical controlling device, or the combination thereof. It is to be noted that the present invention is not limited to the following specific embodiment.

First, geometric errors will be described. A total of six component error parameters (i.e., δx, δy, δz, α, β, γ) are defined as geometric errors; that is, relative translational errors in three directions and relative rotational errors in three directions between the axes. In the case of the five-axis machine as shown in FIG. 2, axes are related from the workpiece to the tool in the order of the C-axis, the A-axis, the Y-axis, the X-axis, and the Z-axis, and if a relation between the Z-axis and the tool is taken into consideration, the total of thirty geometric errors are present. Each of the geometric errors is denoted using symbolic subscripts which represent the name of the two interposed axes. For example, $\delta y_{CA}$ is a translational error in Y-direction between the C-axis and the A-axis, and $\gamma_{YX}$ is a rotational error around the Z-axis between the Y-axis and the X-axis. The tool is denoted using the symbol T.

Since a plurality of redundant error parameters are present in these thirty geometric errors, these redundant error parameters are eliminated to leave only one non-redundant group of error parameters. As a result, the total of thirteen component error parameters are left, which includes $\delta x_{CA}$, $\delta y_{CA}$, $\alpha_{CA}$, $\beta_{CA}$, $\delta y_{AY}$, $\delta z_{AY}$, $\beta_{AY}$, $\gamma_{AY}$, $\gamma_{YX}$, $\alpha_{XZ}$, $\beta_{XZ}$, $\alpha_{ZT}$, and $\beta_{ZT}$. Of these parameters, five error parameters including $\gamma_{YX}$, $\alpha_{XZ}$, $\beta_{XZ}$, $\alpha_{ZT}$, and $\beta_{ZT}$ are geometric errors in regard to translational axes, which are also present in the three-axis machine; these are the perpendicularity between the X-axis and the Y-axis, the perpendicularity between the Y-axis and the Z-axis, the perpendicularity between the Z-axis and the X-axis, the perpendicularity between the tool and the Y-axis, and the perpendicularity between the tool and the X-axis. The remaining eight error parameters are geometric errors in regard to the rotational axes, which include the center position error of the C-axis in X-direction, the offset error between the C-axis and the A-axis, the angular offset error of the A-axis, the perpendicularity between the C-axis and the A-axis, the center position error of the A-axis in Y-direction, the center position error of the A-axis in Z-direction, the perpendicularity between the A-axis and the X-axis, and the perpendicularity between the A-axis and the Y-axis. The computer includes a storage unit for storing these geometric errors.

Figure 3:
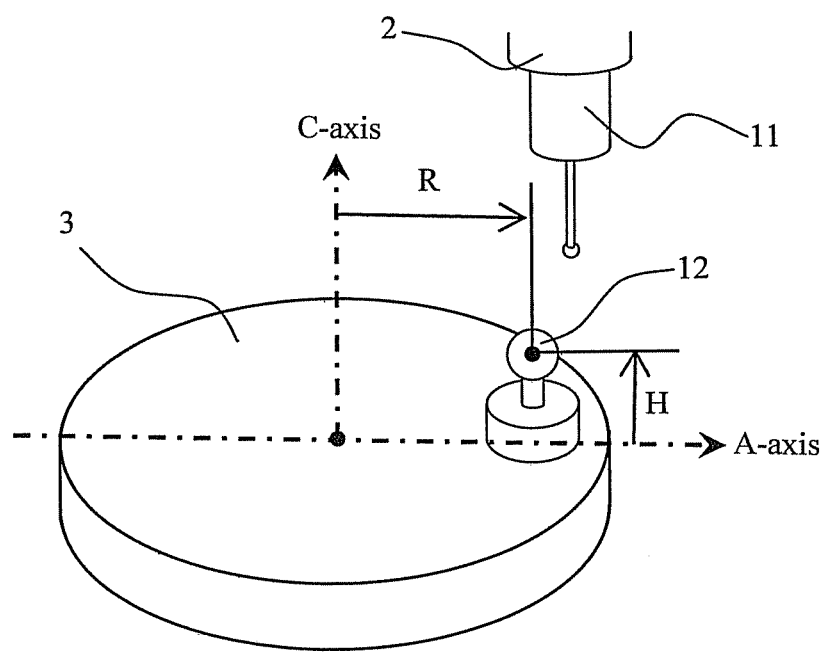
FIG. 3 is a schematic view illustrating one example of a touch trigger probe and a target ball used in the present invention.

According to this embodiment, a touch trigger probe 11 such as shown in FIG. 3 is attached to a spindle head 2. A target ball 12 which is a jig as a measuring object is fixed to a table 3 by means of magnet or the like, and the center position of the ball 12 is measured based on a command of the computer. The touch trigger probe 11 has a sensor (not shown) for sensing contact with the target ball 12, and the sensor transmits an infrared signal or an electric wave signal upon sensing contact with the target ball 12. A receiver is connected to the computer, and the computer measures the current position of each axis as a measured value at the same instant or after a predetermined delay when the receiver receives the signal and stores the measured value in the storage unit. In order to measure the center position of the target ball 12, at least three points are required for contact with the touch trigger probe 11 for measurement if the radius of the target ball 12 is known, and at least four points are required if the radius of the target ball 12 is unknown. Accordingly, the touch trigger probe 11 can be used as a position measurement sensor for measuring the center position of the target ball 12.

Other types of position measurement sensors are known as an alternative of the touch trigger probe 11. These sensors may include, for example, a laser displacement meter capable of measuring distance in a non-contacting manner, and a device including more than three contact-type displacement sensors on the table-side and a sphere attached to the spindle-side, and configured to calculate the center position of the sphere from the measured values of the displacement sensors.

Next, relations between measured values of the center position of the target ball 12 and geometric errors will be described. The computer has a program for calculating the following mathematical expressions regarding the relations, and the storage unit stores this program, the following mathematical expressions, elements or variables of the expressions, and the like.

It is assumed that the center position of the target ball 12 is given by (R, 0, H) on a table coordinate system; the table coordinate system is a coordinate system on the table 3, in which a point of intersections of the A-axis and the C-axis is defined as an origin when considering an ideal state without any geometric errors, and the X-axis of the table coordinate system is parallel to the X-axis of the machine. If no geometric errors are present, the center position measurement value (x, y, z) of the target ball 12 is given by the following mathematical expression (1). Herein, the angle of the A-axis is a, and the angle of the C-axis is c.

$$e = M_A^{-1} M_C^{-1}\, {}^W q \tag{1}$$

where $$e = \begin{bmatrix} x \\ y \\ z \\ 1 \end{bmatrix}, \quad {}^W q = \begin{bmatrix} R \\ 0 \\ H \\ 1 \end{bmatrix}, \quad M_A = \begin{bmatrix} 1 & 0 & 0 & 0 \\ 0 & \cos a & -\sin a & 0 \\ 0 & \sin a & \cos a & 0 \\ 0 & 0 & 0 & 1 \end{bmatrix},$$

$$M_C = \begin{bmatrix} \cos c & -\sin c & 0 & 0 \\ \sin c & \cos c & 0 & 0 \\ 0 & 0 & 1 & 0 \\ 0 & 0 & 0 & 1 \end{bmatrix}$$

Meanwhile, if geometric errors including an attachment position error ($\delta x_{WC}$, $\delta y_{WC}$, $\delta z_{WC}$) of the target ball 12 are present, the determinant with respect to the center position measurement value (x', y', z') of the target ball 12 is given by the following mathematical expression (2). Herein, an approximation is used under the assumption that the geometric errors are sufficiently small.

$$e' = e + \varepsilon_{AY}^{-1} M_A^{-1} \varepsilon_{CA}^{-1} M_C^{-1} \varepsilon_{WC}^{-1}{}^W q - M_Y \varepsilon_{YX} M_X \varepsilon_{XZ} M_Z \varepsilon_{ZT}{}^T p \quad (2)$$

where $$e' = \begin{bmatrix} x' \\ y' \\ z' \\ 1 \end{bmatrix}, \quad {}^T p = \begin{bmatrix} 0 \\ 0 \\ 0 \\ 1 \end{bmatrix}, \quad M_X = \begin{bmatrix} 1 & 0 & 0 & x \\ 0 & 1 & 0 & 0 \\ 0 & 0 & 1 & 0 \\ 0 & 0 & 0 & 1 \end{bmatrix},$$

$$M_Y = \begin{bmatrix} 1 & 0 & 0 & 0 \\ 0 & 1 & 0 & y \\ 0 & 0 & 1 & 0 \\ 0 & 0 & 0 & 1 \end{bmatrix}, \quad M_Z = \begin{bmatrix} 1 & 0 & 0 & 0 \\ 0 & 1 & 0 & 0 \\ 0 & 0 & 1 & z \\ 0 & 0 & 0 & 1 \end{bmatrix},$$

$$\varepsilon_{WC} = \begin{bmatrix} 1 & 0 & 0 & \delta x_{WC} \\ 0 & 1 & 0 & \delta y_{WC} \\ 0 & 0 & 1 & \delta z_{WC} \\ 0 & 0 & 0 & 1 \end{bmatrix},$$

$$\varepsilon_{CA} = \begin{bmatrix} 1 & 0 & \beta_{CA} & \delta x_{CA} \\ 0 & 1 & -\alpha_{CA} & \delta y_{CA} \\ -\beta_{CA} & \alpha_{CA} & 1 & 0 \\ 0 & 0 & 0 & 1 \end{bmatrix},$$

$$\varepsilon_{AY} = \begin{bmatrix} 1 & -\gamma_{AY} & \beta_{AY} & 0 \\ \gamma_{AY} & 1 & 0 & \delta y_{AY} \\ -\beta_{AY} & 0 & 1 & \delta z_{AY} \\ 0 & 0 & 0 & 1 \end{bmatrix},$$

$$\varepsilon_{YX} \begin{bmatrix} 1 & -\gamma_{YX} & 0 & 0 \\ \gamma_{YX} & 1 & 0 & 0 \\ 0 & 0 & 1 & 0 \\ 0 & 0 & 0 & 1 \end{bmatrix}, \quad \varepsilon_{XZ} \begin{bmatrix} 1 & 0 & \beta_{XZ} & 0 \\ 0 & 1 & -\alpha_{XZ} & 0 \\ -\beta_{XZ} & \alpha_{XZ} & 1 & 0 \\ 0 & 0 & 0 & 1 \end{bmatrix},$$

$$\varepsilon_{ZT} \begin{bmatrix} 1 & 0 & \beta_{ZT} & 0 \\ 0 & 1 & -\alpha_{ZT} & 0 \\ -\beta_{ZT} & \alpha_{ZT} & 1 & 0 \\ 0 & 0 & 0 & 1 \end{bmatrix}$$

By expanding this mathematical expression (2), the following mathematical expression (3) can be obtained. In order to simplify the expression, the product of the geometric errors is regarded as sufficiently small and thus approximates to zero.

$$\begin{cases} x' = (R - \delta x_{WC})\cos c - [\{\gamma_{AY}\cos a + \\ (\beta_{AY} + \beta_{XZ})\sin a\}R + \delta y_{WC}]\sin c + \\ \{-\beta_{AY} + \beta_{XZ})\cos a + \gamma_{AY}\sin a - \beta_{CA}\}H - \delta x_{CA} \\ \\ y' = \{-\delta y_{WC}\cos a + \beta_{CA}R\sin a - (\gamma_{AY} + \gamma_{YX})R\}\cos c + \\ \{-(R - \delta x_{WC})\cos a + (\alpha_{CA} + \alpha_{XZ})R\sin a\}\sin c + \\ \{(\alpha_{CA} + \alpha_{XZ})H - \delta y_{CA}\}\cos a + (H - \delta z_{WC})\sin a - \delta y_{Ay} \\ \\ z' = (\beta_{CA}R\cos a + \delta y_{WC}\sin a + \beta_{AY}R)\cos c + \\ \{\alpha_{CA}R\cos a + (R - \delta x_{WC})\sin a\}\sin c + \\ (H - \delta z_{WC})\cos a + (-\alpha_{CA}H + \delta y_{CA})\sin a - \delta z_{AY}. \end{cases} \quad (3)$$

Next, identification of the geometric errors will be described. The computer has a program for calculating the following mathematical expressions regarding the identification of the geometric errors, and the storage unit stores this program, the following mathematical expressions, elements of variables of the expressions, and the like.

Figure 4:
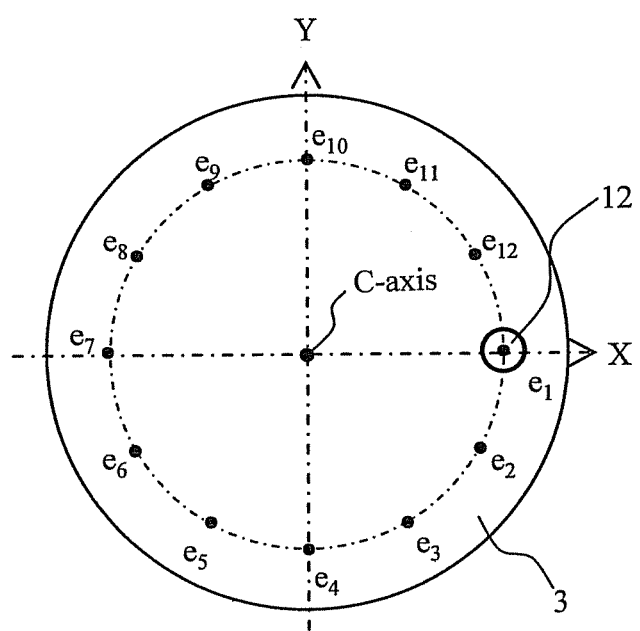
FIG. 4 shows an example of measuring positions in the case where the target ball is indexed at a plurality of angles around a C-axis.

First, the angle of the A-axis is indexed such that the upper surface of the table 3 becomes orthogonal to the main spindle 2 (i.e., the angle of the A-axis is zero degrees (a=0°)), and the angle of the C-axis is indexed from zero degrees to arbitrary angle pitch such the center position of the target ball 12 is measured at n number of point locations on the entire circumference (measuring step). For example, if the angle pitch is set for 30 degrees, as seen in FIG. 4, the measurement takes place at twelve points from 0 degrees to 330 degrees. Accordingly, if i varies from 1 to n, the n number of center position measurement values ($x_i'$, $y_i'$, $z_i'$) of the target ball 12 can be obtained, and the measured values draw a circular trajectory.

Herein, the radius of a circle defined by the measured values on the XY plane, i.e., the distance from the center position of the C-axis to each of the center position measurement values, is R if no geometric errors are present. However, if geometric errors are present, a radius error $\Delta R_{XY}$ will be contained. This $\Delta R_{XY}$ can be calculated by the mathematical expression (4) which is obtained by changing and approximating the expression (3).

$$\Delta R_{XYi} \approx \frac{x_i(x_i' - x_i) + y_i(y_i' - y_i)}{R} = x_i' \cos c_i - y_i' \sin c_i - R \quad (4)$$

By substituting the expression (3) into the expression (4), the following expression (5) can be obtained. Therefore, $\Delta R_{XY}$ is a circular trajectory including zero-order components (radius error), first-order components (center deviation), and second-order components (elliptical shape) (arc approximating step).

$$\Delta R_{XYi} = r_{a0} + r_{a1}\cos c_i + r_{b1}\sin c_i + r_{b2}\sin 2c_i \quad (5)$$

Where 
$$\begin{cases} r_{a0} = -\delta x_{WC} \\ r_{a1} = -\delta x_{CA} - (\beta_{AY} + \beta_{XZ} + \beta_{CA})H \\ r_{b1} = +\delta y_{CA} + \delta y_{AY} - (\alpha_{XZ} + \alpha_{AY})H \\ r_{b2} = \frac{1}{2}R\gamma_{YX} \end{cases}$$

Further, sine functions and cosine functions of angles $\theta_1$ to $\theta n$ obtained by equidistantly dividing 360 degrees by n have properties such as the following expression (6).

$$\begin{cases} \sum_{i=1}^{n} \cos\theta_i = \sum_{i=1}^{n} \sin\theta_i = 0 \\ \sum_{i=1}^{n} \cos^2\theta_i = \sum_{i=1}^{n} \sin^2\theta_i = \frac{n}{2} \end{cases} \quad (6)$$

Properties of the expression (6) can be utilized by particularly focusing attention on the second-order sine components of the expression (5). Indexed second-order sine values of the angle $c_i$ of the C-axis are multiplied with $\Delta R_{XYi}$ corresponding to each of the center position measurement values, followed by taking an average thereof, so that the second-order sine components $r_{b2}$ are obtained. By changing the second-order sine components $r_{b2}$, the following mathematical expression (7) can be obtained for calculating the perpendicularity $\gamma_{YX}$ between the X-axis and the Y-axis (error calculating step).

$$\gamma_{YX} = \frac{2}{R}r_{b2} = \frac{4}{nR}\sum_{i=1}^{n}\Delta R_{XYi}\sin 2c_i \quad (7)$$

The first-order components are further extracted. The first-order cosine components $r_{a1}$ is obtained by multiplying the first-order cosine value of the angle $c_i$ of the C-axis with $\Delta R_{XYi}$. The first-order sine components $r_{b1}$ is obtained by multiplying the first-order sine value of the angle $c_i$ of the C-axis with $\Delta R_{XYi}$. By changing these components, the following mathematical expression (8) can be obtained.

$$\begin{cases} \delta x_{CA} + (\beta_{CA} + \beta_{AY} + \beta_{XZ})H = -r_{a1} = -\frac{2}{n}\sum_{i=1}^{n}\Delta R_{XYi}\cos c_i \\ \delta y_{CA} + \delta y_{AY} - (\alpha_{CA} + \alpha_{XZ})H = r_{b1} = \frac{2}{n}\sum_{i=1}^{n}\Delta R_{XYi}\sin c_i \end{cases} \quad (8)$$

The following mathematical expression (9) can be obtained by changing the expression (3) and calculating the average of the X-coordinate x' or the average of the Y-coordinate y' of each of the center position measurement values. This expression (9) is used for calculating the center of the circular trajectory, i.e., first-order components, and may be utilized instead of the expression (8).

$$\begin{cases} \delta x_{CA} + (\beta_{CA} + \beta_{AY} + \beta_{XZ})H = -\frac{1}{n}\sum_{i=1}^{n}x'_i \\ \delta y_{CA} + \delta y_{AY} - (\alpha_{CA} + \alpha_{XZ})H = -\frac{1}{n}\sum_{i=1}^{n}y'_i \end{cases} \quad (9)$$

On the contrary, as is understood from the expression of the Z-coordinate of the center position measurement values as shown in the expression (3), the Z-coordinate values concern a circle having 0-order component and first-order cosine and sine components with respect to the angle $c_i$ of the C-axis. In order to extract the first-order components of this circle, indexed cosine and sine values of the angle $c_i$ of the C-axis are multiplied with the Z-coordinate of each of the center position measurement values to obtain the following mathematical expression (10). Herein, $\beta_{AY}$ can be calculated from another method or the measurement and expression to be described later, and $\beta_{CA}$, $\alpha_{CA}$ which are geometric errors with respect to the tilt error of the C-axis can be obtained by substituting $\beta_{AY}$ (error calculating step). In the case where an actual vector of the C-axis containing a tilt error is required, a supposed vector without containing errors can be rotated by $\beta_{CA}$, $\alpha_{CA}$ for calculation.

$$\begin{cases} \beta_{CA} = \frac{2}{nR}\sum_{i=1}^{n}z'_i\cos c_i - \beta_{AY} \\ \alpha_{CA} = \frac{2}{nR}\sum_{i=1}^{n}z'_i\sin c_i \end{cases} \quad (10)$$

Next, the A-axis is tilted at an arbitrary angle $a_t$ other than 0 degrees, and the angle c of the C-axis is indexed from zero degrees to arbitrary angle pitch such that the center position of the target ball 12 is measured at n number of point locations on the entire circumference (measuring step). As with the above case, the center position measurement values draw a circular trajectory. The radius of a circle defined by the measured values, i.e., the distance from a point of intersections of the A-axis and the C-axis to each of the center position measurement values, is R if no geometric errors are present. However, if geometric errors are present, a radius error $\Delta R$ will be contained. This $\Delta R$ can be expressed by the following mathematical expression (11) that is obtained by changing and approximating the expression (3).

$$\Delta R_i \approx x_i'\cos c_i - y_i'\sin c_i \cos \alpha_t + z_i'\sin c_i \sin \alpha_t - R \quad (11)$$

By substituting the expression (3) into the expression (11), the following mathematical expression (12) can be obtained. Herein, detailed expressions of $r_{a0}$, $r_{a1}$, $r_{b1}$, and $r_{a2}$ are omitted.

$$\Delta R_i = r_{a0} + r_{a1}\cos c_i + r_{b1}\sin c_i + r_{a2}\cos 2c_i + r_{b2}\sin 2c_i \quad (12)$$

$$\text{where } r_{b2} = \frac{1}{2}R(\gamma_{YX}\cos a_i - \beta_{XZ}\sin a_i)$$

As with the above expression (5), the expression (12) concerns a circular trajectory containing zero-order components to second-order components (arc approximating step). Attention is paid on the second-order sine components. Indexed second-order sine values of the angle $c_i$ of the C-axis are multiplied with $\Delta R_i$ corresponding to each of the center position measurement values, so that the following expression (13) can be obtained. Herein, $\gamma_{YX}$ can be calculated from the expression (7) or another method, and $\beta_{XZ}$ can be calculated by substituting the obtained $\gamma_{YX}$ into the expression (13) (error calculating step).

$$\beta_{XZ} = \frac{\gamma_{YX}\cos a_i - \frac{4}{nR}\sum_{i=1}^{n}\Delta R_i\sin 2c_i}{\sin a_i} \quad (13)$$

It is to be noted that the measurement may not be carried out for the entire circumference in accordance with an indexed angle of the A-axis, because of an interference, for example, between the spindle head 2 and the table 3, a limitation of the movable range of each axis, and the like. If all the center position measurement values are not completed for the entire circumference, the expression (13) is unusable. In this instance, coefficients of the expression (12) are solved by the least square method using a plurality of center position measurement values, so as to obtain the following expression (14).

$$\beta_{XZ} = \frac{\gamma_{YX}\cos a_i - \frac{2r_{b2}}{R}}{\sin a_i} \quad (14)$$

Figure 5:
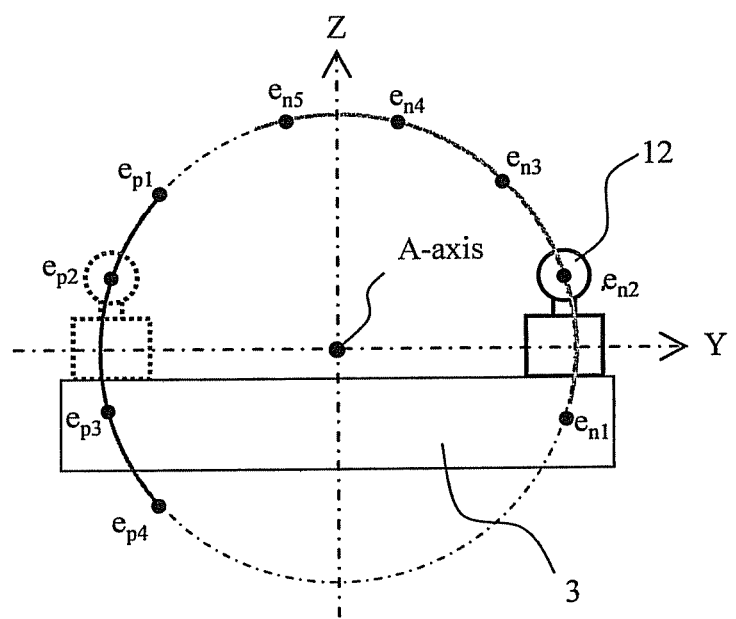
FIG. 5 shows an example of measuring positions in the case where the target ball is indexed at a plurality of angles around an A-axis.

Next, as seen in FIG. 5, the angle $c_t$ of the C-axis is indexed either to 90 degrees or −90 degrees, followed by indexing the angle of the A-axis at a plurality of arbitrary angles. The measurement is carried out at m number of point locations for obtaining the center position of the target ball 12 (calculation step). In most cases, the A-axis is not allowed to rotate a complete turn through 360 degrees because of its mechanism. Further, even if the A-axis is allowed a complete turn through 360 degrees, a measurement may not be carried out at all the point locations because of the location of the touch trigger probe 11. For this reason, the measurement is carried out within a certain angular range, instead of at the entire circumference. Paying attention to the X-coordinate of the center position measurement values, the following expression (15) can be obtained from the expression (3).

$$x'_j = r_{a0} + r_{c0}S + r_{a1}\cos(a_j - \phi) + r_{b1}\sin(a_j - \phi) \quad (15)$$

$$\text{where } S = \begin{cases} +1 & (c_i = +90°) \\ -1 & (c_i = -90°) \end{cases}$$

$$\phi = \tan^{-1}\left(\frac{H}{-R \cdot S}\right)$$

$$r_{a0} = -\delta x_{CA} - \beta_{CA}H$$

$$r_{c0} = -\delta y_{WC}$$

$$r_{a1} = \gamma_{AY}$$

$$r_{b1} = -(\beta_{AY} + \beta_{XZ})$$

Namely, it can be said that the expression (15) concerns a circular arc containing zero-order components and first-order components (arc approximating step). However, when the angle $c_t$ of the C-axis is changed to 90 degrees and −90 degrees and mixed, zero-order components dependent on $c_t$ are also added. By calculating coefficients of elements in the expression (12) as variables using the least squares method, the following mathematical expression (16) can be obtained. Therefore, $\beta_{XZ}$ can be calculated from the above method or another method, and $\gamma_{AY}$ and $\beta_{AY}$ which are geometric errors with respect to the tilt errors of the A-axis can be obtained by substituting $\beta_{XZ}$ (error calculating step) into the expression (16). In the case where an actual vector of the A-axis containing a tilt error is required, a supposed vector without containing errors can be rotated by $\beta_{AY}, \gamma_{AY}$ for calculation.

$$\begin{cases} \gamma_{AY} = r_{a1} \\ \beta_{AY} = -r_{b1} - \beta_{XZ} \end{cases} \quad (16)$$

Next, attention is paid on the Y and Z coordinates of the center position measurement values. Radius errors of the circular trajectory according to the geometric errors, i.e., a distance error $\Delta R_{YZ}$ from the center of the A-axis to the center of the ball can be obtained from the following expression (17).

$$\Delta R_{YZj} \approx y_j' \cos(\alpha_j - \phi) - z_j' \sin(\alpha_j - \phi) - \sqrt{R^2 + H^2} \quad (17)$$

By substituting the expression (3) into the expression (17), the following mathematical expression (18) can be obtained. Herein, detailed expressions of $r_{a0}$ and $r_{c0}$ are omitted.

$$\Delta R_{YZj} = r_{a0} + r_{c0} \cdot S + r_{a1}\cos(a_j - \phi) + \quad (18)$$
$$r_{b1}\sin(a_j - \phi) + r_{a2}\cos2(a_j - \phi) + r_{b2}\sin2(a_j - \phi)$$

$$\text{wherein } \begin{cases} r_{a1} = -\delta y_{AY} \\ r_{b1} = \delta z_{AY} \\ r_{a2} = 0 \\ r_{b2} = -\frac{1}{2}\alpha_{XZ}\sqrt{R^2 + H^2} \end{cases}$$

Therefore, $\Delta R_{YZ}$ concerns an arc trajectory containing zero-order components to second-order components, and the following mathematical expression (19) can be obtained by calculating coefficients of each of the elements using the least squares method.

$$\begin{cases} \delta y_{AY} = -r_{a1} \\ \delta z_{AY} = r_{b1} \\ \alpha_{XZ} = -\dfrac{2}{\sqrt{R^2 + H^2}} r_{b2} \end{cases} \quad (19)$$

Herein, obtaining the coefficients in the expression (18) is the same as obtaining the radius and the center position of the circular arc as well as the magnitude of ellipse components contained in the circular arc (arc approximating step). In general, when obtaining the center position of the circular arc and the ellipse components, the accuracy becomes worth with decreasing the angle of the circular arc. For this reason, as seen in FIG. 5, measurements are carried out by indexing the target ball 12 around the C-axis both at 90 degrees (the center position of the target ball 12 is ranging from $e_{p1}$ to $e_{p4}$) and at −90 degrees (the center position of the target ball 12 is ranging from $e_{n1}$ to $e_{n4}$) (measuring step). Accordingly, the angle of the circular arc can be extended, leading to improved identification accuracy. In the case where the calculation of $\alpha_{XZ}$ is unnecessary, the calculation may be carried out in the expression (19) while ignoring and regarding the second-order components $r_{a2}, r_{b2}$ as being zero.

As described above, the center position of the target ball 12 is measured at a plurality of points using the aforementioned method (measuring step), and eight geometric errors in regard to the rotational axes and also three geometric errors in regard to the translational axes can be identified by means of calculations using the above mathematical expressions (arc approximating step and error calculating step). Therefore, the total of eleven geometric errors can be identified. The remaining two other geometric errors are identified in advance using another method. In the case where an already known geometric error(s) is present, it may be substituted in advance into the above mathematical expression(s). In this instance, unnecessary measurements and calculations may be omitted.

The present invention has been described in detail with reference to a five-axis machining center as one exemplary embodiment of the invention. However, the present invention is not limited to a machining center, and may be applicable to other types of machine tools, such as a multi-tusking machine. Further, other than application to the machine tool, the present invention is applicable to other machine having a rotational axis, such as a three coordinate measuring machine.

What is claimed is:

1. A method for identifying geometric errors with respect to at least two translational axes and at least one rotational axis of a machine using a control device, the method comprising the steps of:
   measuring positions of a jig in three-dimensional space using a position measurement sensor, wherein a measurement is carried out when the jig being indexed around the rotational axis by a plurality of angles is located at the positions;
   approximating a plurality of measured values of the positions measured in the measuring step to a circular arc; and
   calculating an error in regard to a center position of the rotational axis and/or a tilt error in the rotational axis, and tilt errors in the translational axes, based on the circular arc resulting from the approximating step.

2. The method according to claim 1, wherein the approximating step comprises determining a radius of the circular arc by measuring a distance from a center of the rotational axis to the plurality of measured values, and wherein the error calculating step comprises calculating the tilt errors in the translational axes from second-order components of the circular arc.

3. The method according to claim 1, wherein the approximating step comprises determining a radius of the circular arc by measuring a distance from a center of the rotational axis to the plurality of measured values, and wherein the error calculating step comprises calculating the geometric errors in regard to the rotational axis from first-order components of the circular arc.

4. The method according to claim 2, wherein the approximating step comprises determining a radius of the circular arc by measuring a distance from a center of the rotational axis to the plurality of measured values, and wherein the error calculating step comprises calculating the geometric errors in regard to the rotational axis from first-order components of the circular arc.

5. The method according to claim 1, wherein the machine has more than two rotational axes, and wherein in the measuring step, more than two angles are indexed for measurement based on one rotational axis other than the rotational axis from which the plurality of angles are indexed.

6. The method according to claim 2, wherein the machine has more than two rotational axes, and wherein in the measuring step, more than two angles are indexed for measurement based on one rotational axis other than the rotational axis from which the plurality of angles are indexed.

7. The method according to claim 1, wherein in the approximating step, axial components parallel to the rotational axis, from which the plurality of measured values are obtained, are approximated to a circular arc, and wherein a tilt error in the rotational axis is calculated in the error calculating step from first-order components of the circular arc.

8. The method according to claim 2, wherein in the approximating step, axial components parallel to the rotational axis, from which the plurality of measured values are obtained, are approximated to a circular arc, and wherein a tilt error in the rotational axis is calculated in the error calculating step from first-order components of the circular arc.

9. A program stored in a medium for causing a computer to perform the method of claim 1.

10. A program stored in a medium for causing a computer to perform the method of claim 2.

* * * * *